Figure 1:
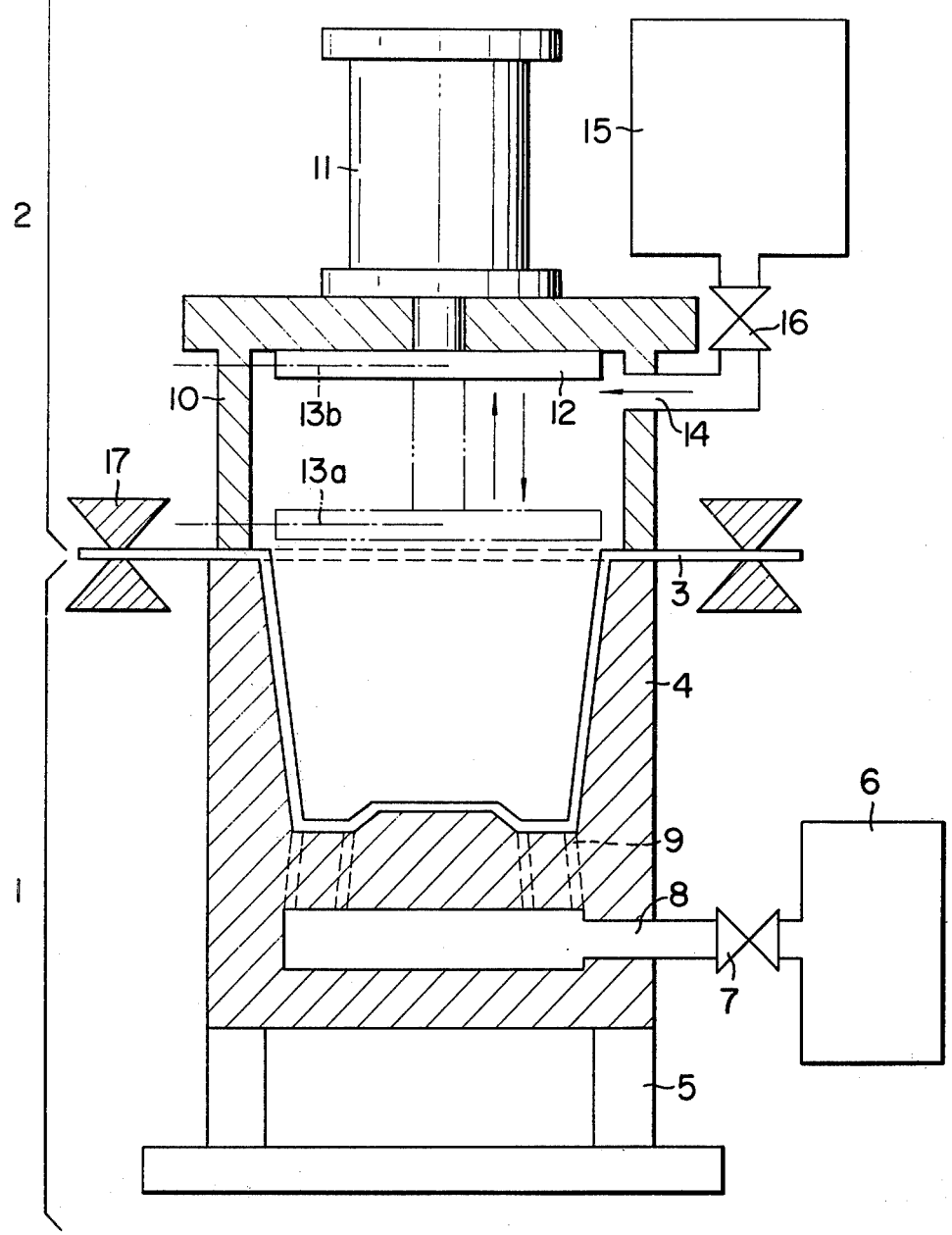

United States Patent [19]

Miki et al.

[11] 4,176,154
[45] Nov. 27, 1979

[54] METHOD FOR THERMOFORMING PLASTIC SHEETS

[75] Inventors: Kyosuke Miki, Yokohama; Masahiro Takeuchi, Yamato, both of Japan

[73] Assignee: Sumitomo Bakelite Company Limited, Tokyo, Japan

[21] Appl. No.: 799,867

[22] Filed: May 23, 1977

[30] Foreign Application Priority Data

May 27, 1976 [JP] Japan ................... 51/60595

[51] Int. Cl.² ............... B29C 17/03; B29C 17/04
[52] U.S. Cl. .................. 264/547; 264/553; 264/549
[58] Field of Search ................ 264/92, 89, 88; 425/387.1

[56] References Cited

U.S. PATENT DOCUMENTS

| | | | |
|---|---|---|---|
| 3,074,110 | 1/1963 | Mard et al. | 264/92 |
| 3,244,780 | 4/1966 | Levey et al. | 264/89 |
| 3,336,424 | 8/1967 | Cheney | 264/92 X |
| 3,470,281 | 9/1969 | Knowles | 264/92 X |
| 3,703,255 | 11/1972 | Wade | 264/92 X |

FOREIGN PATENT DOCUMENTS

51-55360 5/1976 Japan ................ 425/387.1
434015 11/1974 U.S.S.R. ................ 264/89

*Primary Examiner*—Philip Anderson
*Attorney, Agent, or Firm*—Karl W. Flocks

[57] ABSTRACT

A cup-shaped deep-draw-formed article is formed by thermoforming a thermoplastic resin sheet characterized in that a concave forming mold and an ancillary mold which are in opposition to each other are used, said ancillary mold being equipped with a molding assist movable vertically to the opening face of the ancillary mold; the molding assist is first moved toward the opening of the ancillary mold; a preheated thermoplastic resin sheet interposed between said forming mold and ancillary mold is then expanded into the ancillary mold while moving the molding assist in contact with the sheet by introducing a pressured fluid into the forming mold; and when the molding assist reaches a predetermined position, a pressured fluid is introduced into the ancillary mold to press the sheet against the interior surface of the forming mold, thereby forming the sheet into the desired shape. This method can be applied to deep draw forming where the depth to opening diameter ratio is greater than 0.2, to obtain easily a shaped article with a favorable thickness distribution and a high strength or stiffness.

8 Claims, 2 Drawing Figures

METHOD FOR THERMOFORMING PLASTIC SHEETS

This invention relates to a method for producing a cup-shaped article by thermoforming a thermoplastic resin sheet and an apparatus therefor, and more particularly it relates to a method and an apparatus for producing cup-shaped deep-draw-formed article by thermoforming a thermoplastic resin sheet by an ordinary air-pressure forming machine with no need of using a plug as an assistant means.

The plug-assist pressure thermoforming method is well known as a typical thermoforming method for producing cup-shaped deep-draw-formed articles from a plastic sheet. According to this plug-assist pressure thermoforming method, a heated and softened sheet is forced into the female mold by a short-nosed plug, then pressured air is introduced into between the plug and the sheet to allow the sheet to contact intimately with the mold, and the sheet is then cooled to obtain a shaped article. This method makes it possible to adjust the thickness of the articles, and overcomes the disadvantage of the straight vacuum or pressure forming method that the bottom thickness of the deep-draw-formed article is extremely thinned, as a result of which a deep-draw-formed article having a uniform thickness is obtained.

However, in case of using a crystalline thermoplastic resin sheet such as a polypropylene sheet for such a plug-assist pressure forming, accurate adjustment of the plug configuration becomes an important factor for successful forming, and hence there is required a troublesome complicated work for determining the optimum plug configuration for each forming by finely changing the shape of the plug.

The present inventors have conducted research on a method for obtaining deep-draw-formed articles with a uniform thickness distribution without using any assistant plug and already proposed a thermoforming method for producing cup-shaped, deep-draw-formed articles by using a forming mold having a vertically movable mold bottom, according to which method said mold bottom is first raised up to the position of the opening of the mold; a plastic sheet is then supplied over said opening; a pressure fluid is introduced onto the plastic sheet; and the mold bottom is then lowered down to the predetermined position while maintaining the sheet in contact with said mold bottom. This thermoforming method made it possible to obtain cup-shaped, deep-draw-formed articles with a good thickness distribution with no need of using any plug [Japanese Patent Application Kohai (Laid-Open) No. 9151/76 (Application No. 79758/74)], but this thermoforming method is still disadvantageous in that the mold bottom design for the cup-shaped articles is subject to a restriction when a certain kind of sheet material is shaped by said method and the portion near the opening of the resulting article tends to become much thicker than the other portions when a shaped article having a certain shape is produced.

The present inventors have made a further study for overcoming these shortcomings of the previously proposed thermoforming method and, as a result, found that the thickness of the portion near the opening of the shaped article can be made substantially identical with the thickness of other portions by combining the said previously proposed thermoforming method with a reverse-draw forming method.

Accordingly, an object of this invention is to provide a method for producing a shaped article from a thermoplastic resin sheet according to a reverse-draw thermoforming method without using any assistant plug.

Another object of this invention is to provide a method for producing deep-draw-formed articles having a favorable thickness distribution by using said thermoforming techniques.

Still another object of this invention is to provide an apparatus suited for use in practicing the method of this invention.

The other objects and advantages of this invention will become apparent from the following description.

According to this invention, there is provided a method for producing a cup-shaped article by thermoforming from a thermoplastic resin sheet, characterized by using a concave forming mold and a recessed ancillary mold which forms a pair with said forming mold and has therein a molding assist which is movable vertically to the opening face of the ancillary mold and also has substantially the same size and shape as the opening, supplying a heat-softened thermoplastic resin sheet between said forming mold and said ancillary mold, moving said molding assist toward the opening of the ancillary mold to a predetermined position, and then introducing a pressured fluid into the forming mold to allow the sheet to expand toward the interior of the ancillary mold while moving the molding assist in contact with the sheet, and upon arrival of the molding assist at another predetermined position, immediately introducing the pressured fluid into the ancillary mold to press the sheet against the surface of the forming mold, thereby forming the sheet into the desired shape. There is also provided according to this invention an apparatus that can be advantageously used for practicing the abovesaid method.

Figure 2:
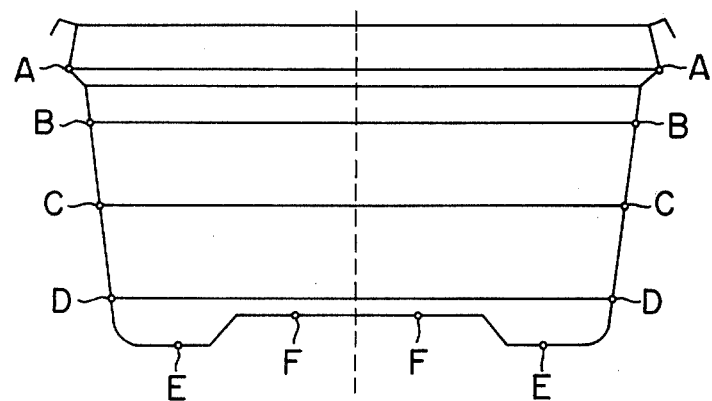

An embodiment of this invention is described in detail referring to the accompanying drawings, in which:

FIG. 1 is a sectional view of an embodiment of thermoforming apparatus according to this invention; and FIG. 2 is a sectional view of a cup-shaped article obtained by use of the method and apparatus of this invention.

In FIG. 1, 1 indicates a forming mold section, 2 an ancillary mold section, 3 a sheet, 4 a forming mold, 5 a mold base, 6 and 15 compressors, 7 and 16 compressed air valves, 8 and 14 compressed air feed ports, 10 an ancillary mold, 11 a molding assist moving mechanism, 12 a molding assist, 13a the initial position of the molding assist, 13b the location of the molding assist after its move, and 17 sheet chucks. In FIG. 2, A, B, C, D, E and F indicate the points at which the thickness was measured, and the broken line is the center line of the cup-shaped article.

In FIG. 1, the thermoforming apparatus according to this invention consists of the forming mold section 1 and the ancillary mold section 2. In the forming mold section 1, the forming mold 4 for forming the heat-softened sheet 3 is fixed on the mold base 5. Compressed air produced in the compressor 6 is supplied through the air valve 7, the air feed port 8 and a plurality of air holes 9 into the forming mold 4 to allow the sheet 3 to expand upwardly.

The ancillary mold section 2 consists of the ancillary mold 10 and the molding assist moving mechanism 11. The ancillary mold 10 has the molding assist 12 which is movable between the position 13a and the position 13b by the molding assist moving mechanism 11 during reverse-draw forming of the sheet 3. The ancillary mold 10 has the compressed air feed port 14. Compressed air released from the compressor 15 is passed through the air valve 16 and the air feed port 14 into the ancillary mold 10 to press the expanded sheet 3 against the surface of the forming mold 4. The sheet 3 is fixed at its both ends by the chucks 17 during the forming operation.

According to this invention, the forming operation is carried out in the following way by using the above-described apparatus.

First, the heat-softened sheet 3 fixed at its both ends by the movable chucks 17 is supplied between the forming mold 4 and the ancillary mold 10 and clamped fast by said two molds. The molding assist 12 of the ancillary mold 10 is first moved to the position 13a and then the compressed air valve 7 is opened to supply compressed air into the forming mold 4 to allow the heat-softened sheet 3 to expand in the interior of the ancillary mold 10 while keeping said sheet in contact with the molding assist. During this operation, the molding assist is moved in a direction opposite to the opening side of the ancillary mold as the sheet expands, and as soon as the molding assist 12 has reached the predetermined position 13b, the compressed air valve 16 is immediately opened to supply compressed air from the compressor 15 into the ancillary mold 10 to press the sheet 3 against the interior surface of the forming mold 4, thereby forming the sheet into the desired shape, after which the sheet is cooled.

The thermoforming method and apparatus according to this invention are suited for forming a sheet made of a non-crystalline thermoplastic resin such as polyvinyl chloride, nitrile resin or styrol resin or a crystalline thermoplastic resin such as polyethylene, polypropylene or thermoplastic polyester. It should be noted that such method and apparatus can be advantageously employed for deep-draw-forming of the crystalline thermoplastic resin sheets which are not suitable for plug-assist pressure forming.

In the method of this invention, heat-softening of the sheet can be accomplished by a known method such as radiant heating, contact heating or hot air circulation, and no specific restriction is placed on the heat-softening method.

In the case of a non-crystalline thermoplastic resin sheet, the temperature for heat-softening the sheet is preferably above the glass transition temperature (Tg) of the sheet, and more preferably within the range of from (Tg+5° C.) to (Tg+50° C.), and in the case of a crystalline thermoplastic resin sheet such as a polypropylene, polyethylene or polyester sheet, the heat-softening temperature is preferably below the melting point (Tm) of the resin, and more preferably within the range of from (Tm−10° C.) to (Tm−40° C.). Too low the sheet heat-softening temperature results in an increase of the unevenness of thickness at the bottom portion of the resulting cup-shaped article, while too high the heat-softening temperature may cause rumples on the side wall of the shaped article and other troubles such as partial crack or break in the shaped article.

In the present invention, there are used a concave forming mold and a concave ancillary mold in pair, the ancillary mold having a molding assist which is movable vertically to the opening face of the ancillary mold. It is desirable that the forming mold and the ancillary mold are arranged in opposition to each other so that they can be moved relatively to each other to clamp the heat-softened sheet along the edge of the mold opening as shown in FIG. 1.

The clamping force between the forming mold and the ancillary mold is desirably high enough to inhibit leakage of the pressured fluid from between the sheet and the forming or ancillary mold when the pressured fluid is supplied into the forming mold or the ancillary mold during the forming operation.

For obtaining the favorable thickness distribution of the shaped article by reducing the thickness of the shaped article at the opening portion, it is desirable to make the area of the opening of the ancillary mold slightly larger than that of the opening of the forming mold.

The ratio of the depth of reverse draw forming into the ancillary mold to the depth of the forming mold is necessary to adjust finely depending upon the shape of the shaped article and the kind of sheet material used, but it is usually desirable to make the depth of the ancillary mold substantially the same as that of the forming mold and adjust the desired position to which the molding assist is to be moved in reverse-draw forming by means of a molding assist stopper.

An air cylinder, a hydraulic cylinder, a metal spring and other means may be used for the ancillary mold assist moving mechanism, though the air cylinder is preferred where minute adjustment of the molding assist moving force is required. In case of using an air cylinder for effecting movement of the molding assist, it is possible to obtain a shaped article with a good thickness distribution by connecting the air feed port of the air cylinder directly to an air tank in which the pressure is maintained constant to allow the air cylinder to serve as an air spring. In order to adjust both the initial position and the position after movement of the molding assist, it is desirable that the ancillary mold section has molding assist stoppers for the respective predetermined positions.

The surface of the molding assist should preferably be as smooth as possible because the surface contacts with the sheet during the reverse-draw forming. If the molding assist surface is rough, marks or scars are left on the sheet at a portion at which the sheet has contacted with the molding assist, whereby the surface gloss of the shaped article is deteriorated.

The shape of the molding assist surface to be contacted with the sheet is not subject to any specific restriction, but it is desirable that the surface is of a flat plate-shape for attaining a favorable thickness distribution of the shaped article.

Preferably, the area of the molding assist surface is substantially equal to the area of the opening of the forming mold. If the area of the molding assist surface is too small as compared with the area of the opening of the forming mold, the sheet may contact even with the end of the molding assist surface at the initial stage of the forming, namely at the time of reverse-draw forming, to form showy streaks on the side wall of the cup-shaped article to impair the appearance of the article.

For adjusting the molding assist surface temperature, it is recommendable to circulate a heating medium in the inside of the molding assist or to embed an electric heater in the molding assist. The molding assist surface may be made of any suitable meterial such as metal or plastic, but it is advisable to use a heat-resistant plastic material such as fluorine resin for allowing smooth and favorable extension of the sheet portion in contact with the molding assist surface during the reverse-draw forming.

The optimum temperature of the molding assist surface may vary depending on the properties such as heat conductivity or smoothness of the surface material and the kind of the sheet material used for forming, but in case of using a metal material such as aluminum for the molding assist surface, it is desirable that the molding assist surface temperature is about 20° to 70° C. lower than that of the heat-softened sheet, while in the case of a heat-resistant plastic material such as fluorine resin, the molding assist surface temperature should preferably be about 50° to 100° C. lower than that of the heat-softened sheet. As the molding assist surface temperature is one of the cardinal factors that govern the thickness distribution of the shaped article, it is preferred to provide a temperature regulator for maintaining the molding assist surface temperature constant.

In performing the forming operation according to this invention, the molding assist is first moved toward the opening of the ancillary mold to a predetermined position, the heat-softened sheet supplied between the forming mold and the ancillary mold is then expanded into the ancillary mold by introducing a pressured fluid into the forming mold while maintaining the sheet in contact with the molding assist, and the molding assist is moved back to another predetermined position as the sheet expands, thereby completing the reverse drawing.

The predetermined position to which the molding assist is first moved toward the opening of the ancillary mold may be varied depending upon the size of a shaped article to be obtained, though it is preferably such that the distance between the molding assist surface to be contacted with the sheet and the level of the clamped sheet is about 1/10 to $\frac{1}{3}$, more preferably about 1/7 to $\frac{1}{5}$, of the depth of the shaped article. When the distance is less than about 1/10, the sheet is expanded beyond the ends of the molding assist, and consequently the resulting shaped article has remarkable wrinkles or rumples on the side wall, namely a bad appearance. When the distance is more than about $\frac{1}{3}$, the resulting shaped article is thicker at the opening portion and is thinner at the bottom. That is to say, the lower part of the shaped article becomes less stiff.

The predetermined position to which the molding assist is to be moved back may be varied depending upon the size of a shaped article to be obtained, though it is preferably such that the distance between the molding assist surface to be contacted with the sheet and the level of the clamped sheet is substantially the same as the depth of the shaped article, more preferably about $\frac{1}{2}$ to $\frac{2}{3}$ of said depth. When said distance is larger than said depth, wrinkles or rumples tend to be formed at the opening portion of the resulting shaped article and the appearance of the article becomes bad.

The molding assist moved toward the opening of the ancillary mold by the operation of the molding assist moving mechanism contacts first with the central portion of the sheet which is expanding convexly into the ancillary mold by reverse drawing, and the area of the portion in contact with the molding assist increases gradually. As the pressure between the molding assist and the sheet is increased the molding assist begins to move in the opposite direction to the opening of the ancillary mold while retaining the sheet in contact therewith, so that the sheet is drawn first at its peripheral portion which is not in contact with the molding assist, with such drawing being effected gradually toward the central portion. The degree of drawing is the smallest at the central portion of the sheet because the central portion remains contacted with the molding assist until the latter moves back to the predetermined position.

Upon completion of the reverse drawing, a pressured fluid is introduced into the ancillary mold to press the sheet against the interior surface of the forming mold, thereby producing a cup-shaped, deep-draw-formed article with a good thickness distribution and a high strength or stiffness.

It is to be noted that if the time of introduction of the pressured fluid into the ancillary mold for blowing after completion of reverse drawing delays, the sheet temperature drops to deteriorate the fidelity of the final shaped article to the mold. The span of time from completion of supply of the pressured fluid into the ancillary mold to introduction of the pressured fluid into the forming mold should preferably be within the range of from 0.1 to 1.0 second. If said time span is less than 0.1 second, there is provided no satisfactory effect of reverse drawing, while a span of more than 1.0 second results in a poor fidelity-to-the-mold of the shaped article.

Although cooling of the forming mold is not essential, it is expedient for improving the forming cycle to circulate a coolant in the forming mold to keep it at a constant temperature.

The forming mold may be made of any suitable material such as metal or plastic, but it is preferred to use a metal material for attaining better control of the forming mold temperature.

The shape of the forming mold used in this invention is also not subject to any specific restriction, but the method and apparatus of this invention find best application for the production of a deep-draw-formed article where the depth to opening diameter ratio is from 0.2 to 1.0. In case the depth to opening diameter ratio is less than 0.2, it is possible to obtain a shaped article with a relatively uniform thickness distribution even by a straight vacuum or pressure forming method, but if such a ratio becomes more than 1.0, it becomes harder to obtain the cup-shaped article with a favorable thickness distribution and a high strength or stiffness.

When the pressure of the pressured fluid introduced into the forming mold is from 0.5 to 5.0 kg/cm$^2$, it is recommended that the pressure applied by the moving mechanism to the molding assist of the ancillary mold is within the range of from 0.1 to 2.0 kg/cm$^2$ and the pressure of the pressured fluid introduced into the ancillary nold is within the range of from 1.0 to 7.0 kg/cm$^2$.

Combined use of an air regulator and a speed controller is recommended for adjusting the pressure of the pressure fluid introduced into the forming mold during the reverse drawing operation. The speed controller is used for adjusting the rise-up speed of the pressure in the reverse drawing. The thickness of the sheet at a portion at which the sheet contacts with the moving molding assist can be increased by lowering the rise-up speed of the pressure in the reverse-drawing to allow obtainment of a final shaped article with the thick-walled lower portion.

For making the fidelity-to-the-mold of the shaped article better it is preferable to supply a heated pressured fluid into the forming mold to expand the sheet into the ancillary mold during the reverse draw operation. When the heated pressured fluid for reverse drawing is used the sheet is not cooled during reverse drawing, resulting in better stretchability of the sheet during the forming operation to obtain a shaped article with a good fidelity to the mold.

In the production of the cup-shaped, deep-draw-formed article with a depth to opening diameter ratio of more than 0.2 according to the method and apparatus of this invention, no restriction is placed on the design of the bottom of the forming mold and it is possible to obtain with ease the shaped article with a good thickness distribution even at the opening portion of the product.

Although the ancillary mold section is placed above the forming mold section in FIG. 1, they may be reversed in position to attain the same effect and such an arrangement is, of course, embraced within the scope of this invention.

The present invention is now described below in further detail referring to an Example, which is by way of illustration and not by way of limitation.

EXAMPLE

A cup-shaped round container with a top opening diameter of 90 mm and a depth of 50 mm was formed by using a vacuum pressure forming machine with a forming area of 300×250 mm according to the method and apparatus of this invention.

The forming apparatus used was of the type shown in FIG. 1. The forming mold and the ancillary mold were made of iron, and the molding assist in the ancillary mold was a 95 mm diameter iron disc having secured to its surface a 0.5 mm thick aluminum plate. An air cylinder was used as the molding assist moving mechanism. The air inlet at the top of this air cylinder was connected to an air tank in which the pressure was maintained constant. The ancillary mold was 105 mm in opening diameter and 70 mm in depth.

A 0.7 mm thick polypropylene sheet, a 0.8 mm thick high-density polyethylene sheet containing 40 wt% of talc and a 0.45 mm thick nitrile resin sheet were subjected to forming according to the method of this invention.

The sheet properly set between the ancillary mold and the forming mold was preheated by an infrared heater positioned above the sheet, and after the completion of the preheating, the heater was moved away and the preheated sheet was clamped by the forming mold and the ancillary mold as shown in FIG. 1. The molding assist of the ancillary mold was moved toward the opening of the mold, 0.2 second after which compressed air for reverse-draw was supplied under a pressure of 3 kg/cm$^2$ into the forming mold, to expand the sheet into the ancillary mold while maintaining the sheet in contact with said molding assist. The molding assist was moved back by the pressure of the compressed air, and when it reached the predetermined position, 5 kg/cm$^2$ of compressed air was immediately supplied into the ancillary mold to press the sheet against the interior surface of the forming mold to form the sheet into the desired shape, and the sheet was then cooled. An air cylinder was used as the moving mechanism for the molding assist of the ancillary mold, with the air inlet port of said cylinder being directly connected to an air tank in which the interior pressure was adjusted to 2.0 kg/cm$^2$. The position to which the molding assist was moved toward the opening of the ancillary mold and the predetermined position to which the molding assist was moved back in the ancillary mold during the reverse draw operation were 15 mm and 28 mm, respectively, from the level of the clamped sheet. The relative timing of the movement of the molding assist to the opening of the mold, the introduction of the compressed air into the forming mold and the introduction of the compressed air into the ancillary mold was controlled by short-time timers operated by opening and closure of the solenoid valves mounted in the respective compressed air feeding passages.

The thickness distributions of the round-shaped articles obtained from the polypropylene sheet, the talc-containing high-density polyethylene sheet and the nitrile resin sheet according to the forming method mentioned above was measured at each position in the cross section indicated in FIG. 2. For the sake of comparison, another shaped article was produced from said sheets according to a thermoforming method in which a forming mold of the same shape was used, except that the mold bottom could be moved up and down, and the mold bottom was moved down to the desired position while holding the sheet with the mold bottom, thereby forming the sheet (Japanese Patent Application Kokai (Laid-Open) No. 9151/76), and the thickness distribution of the resulting shaped article was measured in the same manner as above.

Table 1 shows the measured values of thickness of the above-said shaped articles at the respective points indicated in FIG. 2. Each value given in Table 1 is the mean of the values obtained from measurements at six points located in substantially the same distance in the same level, each two being symmetrical to each other in respect of the center line (shown by the broken line in FIG. 2) of each shaped article. As noticed from the table, the thickness at the position (A) near the opening in each of the comparative shaped articles is unnecessarily large, whereas the thickness at said position in any of the shaped articles obtained according to the method of this invention is noticeably reduced while the lower position (D) in the side wall of each shaped article obtained according to this invention is greater in thickness than any of the comparative shaped articles, indicating a higher strength than the comparative shaped articles.

As apparent from the results given in Table 1, use of the method of this invention can improve the thickness distribution of the cup-shaped articles, and particularly a marked improvement is made in thickness in the position near the opening of each shaped article.

The method of this invention also enables the production of deep-draw-formed articles with excellent external appearance regardless of the shape of the bottom of the forming mold employed.

Table 1

| No. | | | 1 | 2 Talc-containing poly-ethylene | 3 Nitrile resin |
|---|---|---|---|---|---|
| Kind of sheet | | | Polypropylene | | |
| Sheet thickness (mm) | | | 0.7 | 0.8 | 0.45 |
| Thickness of shaped article obtained by the method of this invention (mm) | Points of measurement | A | 0.31 | 0.34 | 0.22 |
| | | B | 0.23 | 0.26 | 0.17 |
| | | C | 0.23 | 0.24 | 0.17 |
| | | D | 0.31 | 0.29 | 0.19 |
| | | E | 0.24 | 0.26 | 0.16 |
| | | F | 0.33 | 0.37 | 0.23 |
| Thickness of comparative shaped article | Points of measurement | A | 0.50 | 0.54 | 0.33 |
| | | B | 0.33 | 0.37 | 0.21 |
| | | C | 0.20 | 0.23 | 0.12 |
| | | D | 0.23 | 0.24 | 0.17 |

Table 1-continued

| No. | | 1 | 2 | 3 |
|---|---|---|---|---|
| Kind of sheet | | Polypropylene | Talc-containing polyethylene | Nitrile resin |
| Sheet thickness (mm) | | 0.7 | 0.8 | 0.45 |
| (mm) | E | 0.21 | 0.20 | 0.13 |
| | F | 0.31 | 0.35 | 0.17 |

What is claimed is:

1. A method for producing a shaped article by thermoforming a thermoplastic resin sheet, which comprises:

heating a thermoplastic polypropylene sheet, having a crystal melting point of Tm, at a temperature ranging from $(Tm-10)°$ C. to $(Tm-40)°$ C.;

fixing said heat-softened thermoplastic polypropylene sheet between a concave forming mold the edge of which defines an open mouth and a concave ancillary mold the edge of which defines an open mouth, said molds being placed mouth to mouth in opposition to one another, and said ancillary mold having a molding assist in the form of a flat plate which is movable by means of a moving mechanism toward and away from the mouth of said ancillary mold;

providing said molding assist in said ancillary mold adjacent the mouth thereof such that the distance between the molding assist surface to be contacted with the sheet and the level of the fixed sheet is 1/10 to ⅓ of the depth of the shaped article;

introducing a pressurized fluid at a pressure of 1.5 kg/cm² to 5 kg/cm² into the forming mold to expand the sheet into the ancillary mold thereby contacting first the central part of the sheet with the flat surface of the molding assist and successively increasing the contacting area of the sheet until the peripheral part of the sheet contacts the flat surface of the molding assist;

moving the molding assist backwardly by means of pressure of the pressurized fluid applied to the surface of the molding assist through the sheet from the forming mold side while expanding the sheet into the ancillary mold until the height of the flat surface of the molding assist in contact with the sheet reaches a depth from about ½ to about the same as the depth of the intended shaped article, whereby the peripheral portion of the sheet which is not in contact with the molding assist is stretched and said stretching extends to the central portion of the sheet as the molding assist is so moved backwardly into the concavity of the ancillary mold; and immediately thereafter introducing a pressurized fluid at a pressure of 1.0 kg/cm² to 7.0 kg/cm² into the ancillary mold to press the sheet against the interior surface of the forming mold, thereby forming the sheet into the desired shape.

2. A method in accordance with claim 1 wherein said introduction of pressurized fluid into the forming mold to expand the sheet into the ancillary mold is effected using a pressurized fluid under a pressure of at least 3 kg/cm²; and wherein the pressure of the pressurized fluid introduced into the ancillary mold to press the sheet against the interior surface of the forming mold is at least 5 kg/cm².

3. A method in accordance with claim 1 wherein the face of the molding assist contacting the plastic sheet is a metal and is maintained at a surface temperature about 20°–70° C. lower than that of the heat-softened sheet.

4. A method in accordance with claim 1 wherein the face of the molding assist which contacts the plastic sheet is formed of a heat-resistant plastic material and is maintained at a temperature about 50°–100° C. lower than that of the heat-softened sheet.

5. A method in accordance with claim 1 wherein the distance between the molding assist surface to be contacted with the sheet and the level of the fixed sheet is 1/7 to ⅓ of the depth of the shaped article.

6. A method in accordance with claim 1 wherein the height of the flat surface of the molding assist in contact with the sheet reaches a maximum depth of about ½ to ⅔ of the depth of the final article.

7. A method in accordance with claim 1 wherein the span of time from completion of supply of pressurized fluid into the ancillary mold to introduction of the pressurized fluid into the forming mold constitutes 0.1 to 1.0 seconds.

8. A method in accordance with claim 1 wherein the depth to opening diameter ratio of the forming mold and, consequently, the resultant product is from 0.2 to 1.0.

* * * * *